(12) United States Patent
Gokhale et al.

(10) Patent No.: US 6,757,892 B1
(45) Date of Patent: Jun. 29, 2004

(54) METHOD FOR DETERMINING AN OPTIMAL PARTITIONING OF DATA AMONG SEVERAL MEMORIES

(75) Inventors: Maya B. Gokhale, Los Alamos, NM (US); Janice M. Stone, Princeton, NJ (US); John P. Riganati, Skillman, NJ (US)

(73) Assignee: Sarnoff Corporation, Princeton, NJ (US)

( * ) Notice: Subject to any disclaimer, the term of this patent is extended or adjusted under 35 U.S.C. 154(b) by 445 days.

(21) Appl. No.: 09/603,172

(22) Filed: Jun. 23, 2000

Related U.S. Application Data
(60) Provisional application No. 60/140,889, filed on Jun. 24, 1999.

(51) Int. Cl.[7] ................................................. G06F 9/45
(52) U.S. Cl. ........................ 717/161; 717/150; 711/173; 712/241; 716/17
(58) Field of Search ................................ 717/149, 150, 717/151, 154, 159, 158, 160, 161; 712/1, 13, 200, 220, 223, 240–241; 711/200, 205, 206, 207, 210, 173; 716/17

(56) References Cited

U.S. PATENT DOCUMENTS

| 6,023,583 | A | * | 2/2000 | Honda ......................... 717/158 |
| 6,075,935 | A | * | 6/2000 | Ussery et al. .................. 716/17 |
| 6,092,180 | A | * | 7/2000 | Anderson et al. ........... 712/200 |
| 6,113,651 | A | * | 9/2000 | Sakai et al. .................. 717/154 |
| 6,170,998 | B1 | * | 1/2001 | Yamamoto et al. ......... 717/154 |
| 6,219,833 | B1 | * | 4/2001 | Solomon et al. ............ 717/149 |

OTHER PUBLICATIONS

Jeffrey M. Arnold, An Architecture Simulator for National Semiconductor's Adaptive Processing Architecture (NAPA), 15–17 Ap 1998.*

* cited by examiner

Primary Examiner—Anthony Nguyen-Ba
(74) Attorney, Agent, or Firm—William J. Burke (57) ABSTRACT

A method and system for optimizing variable locations within disparate storage elements in a target processing environment according to a least cost analysis based upon the number of times a variable is accessed by one or more program loops forming a program.

15 Claims, 3 Drawing Sheets

METHOD FOR DETERMINING AN OPTIMAL PARTITIONING OF DATA AMONG SEVERAL MEMORIES

CROSS-REFERENCE TO RELATED APPLICATIONS

This non-provisional patent application claims the benefit of U.S. provisional patent application Serial No. 60/140,889 filed Jun. 24, 1999, which is herein incorporated by reference in its entirely.

This non-provisional patent application is related to commonly assigned and simultaneously filed U.S. patent application Ser. No. 09/603,175 filed Jun. 23. 2000, entitled CO-SYNTHESIS OF HARDWARE/SOFTWARE FOR A HYBRID PROCESSOR (hereinafter the CO-SYNTHESIS application), which is incorporated herein by reference in its entirety.

This invention was made with U.S. government support under contract number DABT63-97-1-100. The U.S. Government has certain rights in this invention.

This invention relates to the field of computer compilers. More specifically, this invention relates to a method and system for determining an optimal allocation of variables between several memories within a target processing system.

BACKGROUND OF THE INVENTION

A compiler is a program that translates programs written in a source language to those written in a target language. The source language is typically a high level language such as Fortran or "C." The target language is typically assembly code or machine language, but may be a higher level language as well. A compiler usually performs various optimizations to improve the performance of the target program for a given machine. An optimization is any transformation of the program with the aim of improving the performance of the target program.

A "hybrid architecture" processor combines a conventional von Neumann Fixed Instruction Processor (FIP) with the programmable logic on an Adaptive Logic Processor (ALP) to form a single processing unit. Source code compiled to target a hybrid processor should provide a combination of conventional instruction set software for use in the FIP portion of the hybrid processor and a hardware description for use in the ALP portion of the hybrid processor.

Typically, programmers specify the locations of variables declared in the source code using pragma statements inserted within the source code. In this manner, the programmer defines the type and/or location of memory used to support a particular variable. Within the context of a small memory map having few memory variations, such explicit location of variable storage is adequate. However, within the context of a hybrid processing environment, such explicit location of variable storage becomes more difficult.

Therefore, it is seen to be desirable to provide a method and system for optimizing variable location within disparate storage elements of a hybrid processor. It is also seen to be desirable to optimize the location of such variables in a cooperative manner with a compiler program including other types of optimization, such as pipeline scheduling optimizations, and the like.

SUMMARY OF THE INVENTION

The invention comprises method and system for optimizing variable locations within disparate storage elements in a target processing environment according to a least cost analysis based upon the number of times a variable is accessed by one or more program loops forming a program. Specifically, the invention operates to minimize the execution cost of a compiled program by allocating variables associated with the compiled program to a plurality of memories within a target system according to the number of times the variables are utilized by the various program loops forming the program.

The memory partitioning determination method determines an allocation of specified variables among several memories that optimizes execution time of loops for which execution time is a function of the maximum number of accesses to any one memory.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
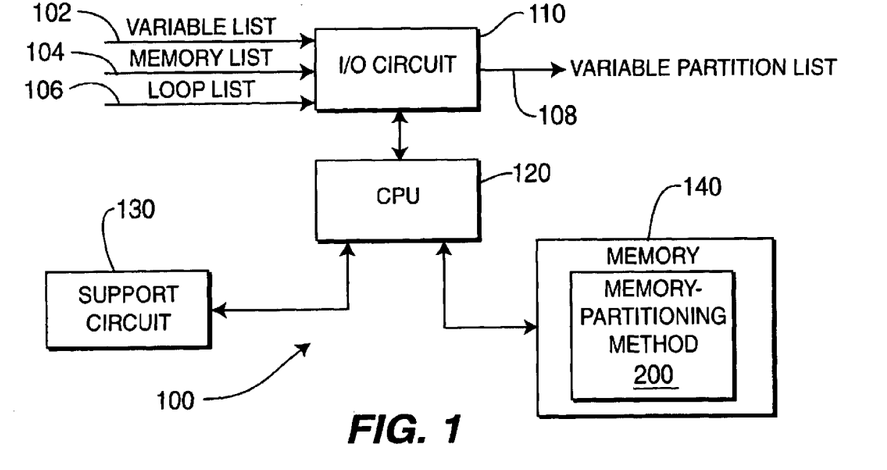
FIG. 1 depicts a high level block diagram of a general purpose computer suitable for implementing processes and methods according to the present invention.

FIG. 1 depicts a high level block diagram of a general purpose computer 100 suitable for implementing processes and methods according to the present invention. The general purpose computer 100 of FIG. 1 comprises a central processing unit (CPU) 120, a memory device 140, a variety of support circuits 130, and an input/output (I/O) circuit 110. The CPU 120 can be any type of processor such as a PENTIUM III manufactured by Intel Corporation or a POWERPC manufactured by Motorola, Inc. The support circuitry 130 for the CPU 120 includes conventional cache, power supplies, clock circuits, data registers, I/O interfaces and the like. The I/O circuit 110 generally includes a conventional keyboard, mouse, printer and interface circuitry adapted to receive and transmit data, such as data files and the like. The memory device 140 can be random access memory (RAM), read only memory (ROM), hard disk storage, floppy disk storage, compact disk storage or any combination of these and similar storage devices. The memory device 140 stores the program or programs (e.g., memory partitioning method 200) that are executed to implement the methods of the present invention. When the general purpose computer 100 executes such a program, it becomes a special purpose computer, that is, the computer becomes an integral portion of a system implementing the methods and processes of the present invention. Although the invention has been disclosed as being implemented as an executable software program, those skilled in the art will understand that the invention may be implemented in hardware, software, or a combination of hardware and software. Such implementations may include a number of processors independently executing various programs and dedicated hardware such as application specific integrated circuits (ASICs).

Assume that a given program utilizes a collection of variables, and a set M of k memories, and that each of the variables can be allocated to any memory. A variable's allocation within memory is fixed for the duration of program execution. The invention seeks to determine how to allocate the variables to the available memories such that no other allocation results in a smaller execution time of the program's loops, with respect to the memory model specified below.

The invention operates to minimize the execution cost over all possible groupings of the variables into k groups. An embodiment of the invention uses the technique of implicit enumeration to diminish the exploration space. An implicit enumeration technique is described in an article published in Management Science, vol. 16, no. Sep. 1, 1969 entitled "A functional equation and its application to resource allocation and sequencing problems," by E. L. Lawler and J. M. Moore, which article is incorporated herein by reference in its entirety.

Cost is defined for this execution model as the sum of the costs of executing all the loops, each a given number of times. The cost of executing a loop once is chosen according to one of several memory models, and is a function of the number of read and write accesses to variables in the collection.

Broadly speaking, the general purpose computer 100 of FIG. 1 receives a variable list 102, a memory list 104 and a loop list 106 representing, respectively, a collection of variables to be allocated, a set M of k memories within which the variables are to be allocated and a list of processing loops utilizing the variables. The received variable list 102, memory list 104 and loop list 106 is processed by the memory partitioning program 200 by the CPU 120 to produce a variable partition list 108. The variable partition list 108 comprises a list of assignments of the variables to appropriate memories such that execution time of the program utilizing the variables is reduced (i.e., the execution time of the processing steps provided in the loop list 106 is reduced).

The memories typically comprise random access memory (RAM) such as high speed "scratch pad" memory or cache memory, extended memory, and other types of memory. Essentially, given a hybrid processor including a plurality of memory types, where some types are faster than other types and/or of different sizes, the invention operates to determine an appropriate memory for storing individual variables or variable arrays based upon several factors, including the number of times the variables is accessed within a program loop, the number of times the loop is accessed and other factors which will be described in more detail below.

Definitions

The following definitions will be used in describing the memory partitioning determination method of the present invention:

1. A k-vector is a vector $x=<x_1, \ldots, x_k>$ of integers, for some integer k. Notation: for $1 \leq n \leq k$, $x(n)=x_n$.

2. Two vectors $v_1$ and $v_2$ are equal if that there is some integer k for which $v_1$ and $v_2$ are k-vectors and they are equal element-wise:

for $i=1, \ldots, k$, $v_1(i)=v_2(i)$.

3. p is a function that reorders the elements of a vector in non-increasing order.

4. Two vectors $v_1$ and $v_2$ are equivalent if $p(v_1)=p(v_2)$.

5. $\sigma$ is a function of two vectors $v_1$ and $v_2$ of the same length that applies p to $v_1$ and then reorders $v_2$ according to the same permutation that reordered $v_1$. The value of the function is the reordered version of the vector $v_2$.

6. A summary vector is a vector $<v_1, \ldots, v_p>$ of k-vectors, for some integers p and k. Notation: for a summary vector $V=<v_1, \ldots, v_p>$ of k-vectors and $1 \leq m \leq p$ and $1 \leq n \leq k$, $V(m,n)=(V(m))(n)$.

7. Rho is a function defined on summary vectors that reorders its elements individually: for a summary vector $V=<v_1, \ldots, v_p>$, Rho $(V)=<p(v_1), \ldots, p(v_k)>$.

8. Two summary vectors $V_1$ and $V_2$ are equivalent if Rho $(V_1)$=Rho $(V_2)$.

9. The execution model is as follows:

A computation is represented as a collection of nodes, with two dependence relations defined on pairs (n, n*) of nodes as follows:

n before n* n* not before n.

where:

A node can be executed when all the node's predecessors have been executed. Execution of a computation node takes one or more execution steps. Multiple nodes may be executed during a single step.

A loop is a computation that is executed repeatedly. A pipelined loop is a loop for which successive iterations can be initiated before previous iterations are completed. The initiation interval of a pipelined loop is the number of executation steps between the beginning of successive iterations. It is assumed that the initiation interval for a pipelined loop depends only upon the maximum number of accesses to any one memory. This assumption holds for several tested memory models, including that shown in the CO-SYNTHESIS application where (1) for the disclosed pipeline scheduler, a lower bound on initiation interval is the maximum number of uses of any one resource and (2) that the only resources in contention are resources used to access memory.

10. The read/write concurrency property of a memory is "concurrent" if a read and a write access may be initiated during the same cycle, and is otherwise "serialized". The concurrency penalty of a memory is the scheduling delay required between two accesses to the same memory.

The input data processed according to an embodiment of the invention will now be discussed in more detail. Specifically, the input data to be processed comprises: (1) a list (102) $D=d_1, \ldots, d_m$ of variables to be allocated; and (2) a list (104) M=memory$_1$, . . . , memory$_k$ of available memories in which any of the variables in D may be allocated and which all have the same read/write concurrency property. For each memory$_j$, the size of the memory is given by memory_size$_j$. The footprint of a memory is its size, and footprint(M) is the k-vector <footprint(memory$_i$), . . . , footprint(memory$_k$)>. Let M be ordered by non-increasing footprint size; that is, for i<j, footprint(memory$_i$)$\geq$footprint(memory$_j$). Equivalently: p (footprint(M))=footprint(M). Additionally, the input data comprises (3) a list (106) Loops=Loop$_1$, . . . , Loop$_p$ of p innermost loops with each of which is associated with (a) a repetition count repetitions Loop$_i$ that gives the total number of times that the Loop$_i$ is executed; and (b) for each variable d in D, an access count N(i, d) giving the total number of times d is accessed in the Loop$_i$.

In one embodiment of the invention, if the read/write concurrency property of the memories is "concurrent", the access count for a variable d is the maximum of the number of read accesses to d and the number of write accesses to d. Otherwise, the access count for variable d is the sum of the numbers of read accesses to d and write accesses to d.

After processing the above-described input data according to the present invention, an output result is provided in which the listed variables D have been optimally allocated to the memories M in a manner substantially dictated by the use of the variables in the various loops. Specifically, a partition of the variables in D among the k memories that assigns each $d_1$ in D to some memory$_j$ in the available memory M. The invention uses the technique of implicit enumeration to diminish the exploration space. It is noted by the inventors that for some numerically intensive computations benefiting from the invention, loops reference a small number, typically 2 or 3, of array variables. Known compilation techniques can use a single read access for each scalar variable, for all the iterations of the loop, and can limit the number of accesses per array variable per loop iteration to at most 1 read and 1 write. The invention gives an allocation that is optimal in the sense that no other allocation of the variables in D to the memories in M likely results in a smaller execution time, with respect to the execution model given above, of the loops in Loops.

Figure 2:
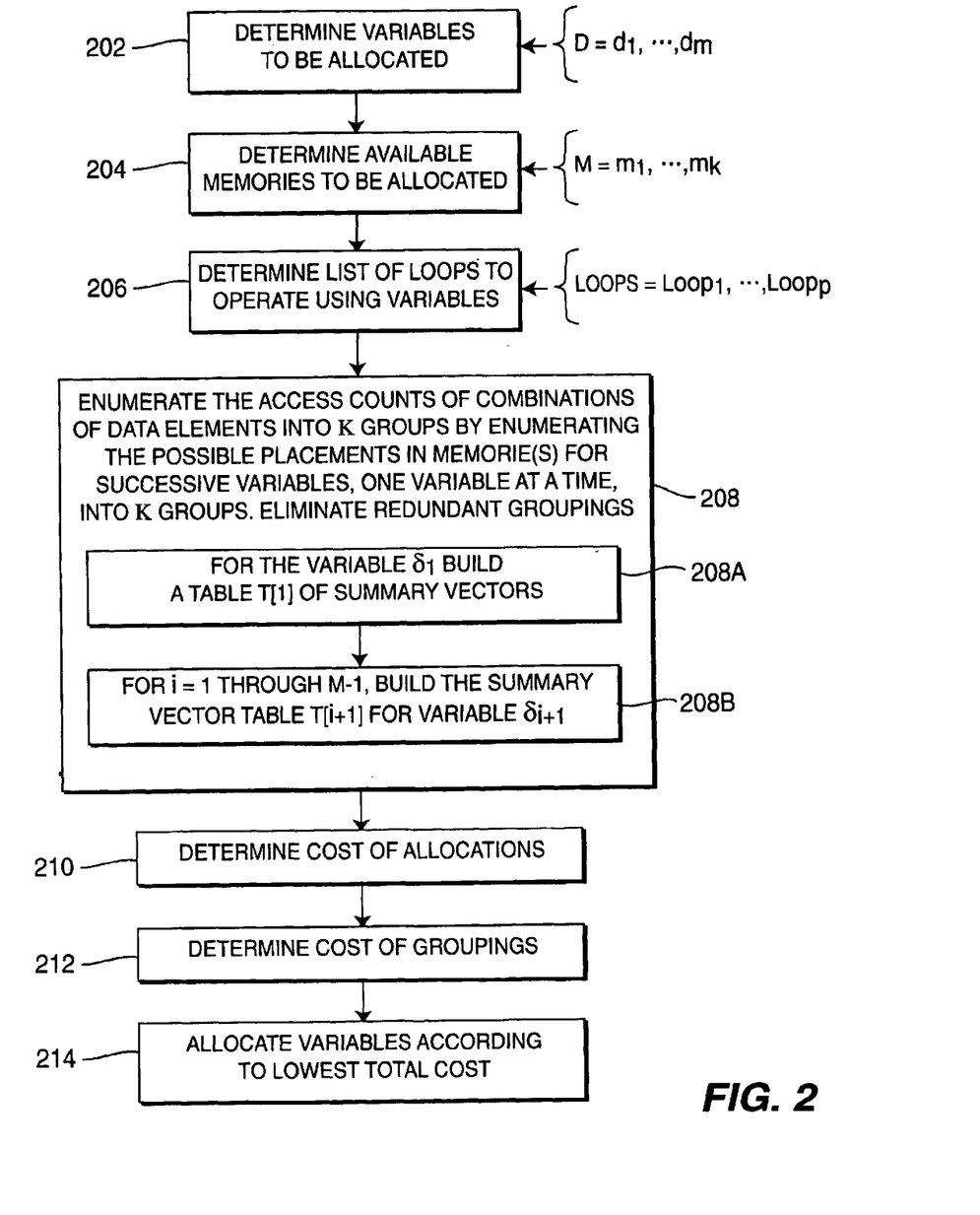
FIG. 2 depicts a flow diagram of a memory partitioning method according to an embodiment of the present invention.

FIG. 2 depicts a flow diagram of a memory partitioning method according to an embodiment of present invention. The method 200 of FIG. 2 is entered at step 202, where the variables to be allocated are determined with respect to, for example, the variable list 102 described above. At step 204, the available memories to be allocated are determined with respect to, for example, the list 104 of memories to be allocated as described above. At step 206, the list of loops to operate using the variables to be allocated is determined with, for example, the list 106 described above. The method 200 then proceeds to step 208.

At step 208, the method enumerates the access counts for various combinations of the data elements into k groups by enumerating the possible placements for successive variables, one variable at a time, into k groups. The method also eliminates redundant groupings (i.e., groupings that are equivalent to previously generated groupings). The method 200 then proceeds to step 210.

In one embodiment of the invention, a summary vector table T[I] is built for each variable $D_i$. Each summary vector table comprises a plurality of rows for describing respective partial allocations of memory. Each row comprises a "Grouping" and a corresponding summary vector. A Grouping comprises an I-vector assigning the first I variables $D_1$ ..., $D_1$ to Groups, represented by integers between 1 and k, inclusive. A summary vector of the access counts to the k groups by the p Loops, for the partial allocation. Moreover, associated with each grouping G is a k vector footprint(G) in which the $i^{th}$ element gives the sum of the sizes of the data elements that are mapped to group i in the Grouping G.

Thus in one embodiment of the invention, step 208 is implemented using steps 208A and 208B. At step 208A, a table T[1] of summary vectors is constructed for a variable $D_1$. At step 208B, a summary vector table T[i+1] is built for each variable $D_{i+1}$ for i=1 through M-1.

At step 208A, the method 200 builds the summary vector table T[1] of summary vectors for variable di. It is noted that the summary vector table T[1] provides a single grouping for the variable $d_1$ in Group 1, expressed by the grouping vector <1>. The footprint of this grouping is <size $(d_1)$, 0, ..., 0>, where for a variable d, size (d) is the amount of memory required to represent variable d, given in terms of an allocation unit that is used for all the memories in M.

An exemplary form of the table T[1] is provided below as Table 1. The top (title) row indicates that this is table T[1], for subject variable $d_1$. In the left-most column, labeled Groupings, is a vector, which for T[1] has length 1, giving the group number that this allocation assigns to the subject variable $d_1$. The remaining columns show the vectors that comprise the summary vector, with columns for 2 loops (Loop 1 and Loop 2). The entry in each loop column is a k-vector giving the access counts for the k memories for that loop that result from the specified grouping: that is, for each loop Loop$_j$ and each variable $d_i$, $n_{ij}$ is the access count for $d_i$ for Loop$_j$. It is noted that the method does not actually generate the rows for the groupings that assign $d_1$ to groups 2, ..., k, because they are equivalent to the first row. These rows are shown as shaded rows to demonstrate the part of the search space that is eliminated.

TABLE 1

Table T[1]
For variable $d_1$

| Groupings <$d_1$> | Loop 1 | Loop 2 |
|---|---|---|
| <1> | <$n_{11}$, 0, ... 0> | <$n_{13}$, 0, ..., 0> |
| <2> | <0, $n_{11}$, 0, ..., 0> | <0, $n_{13}$, 0, ..., 0> |
| ... | ... | ... |
| <k> | <0, ..., 0, $n_{11}$> | <0, ..., 0, $n_{13}$> |

At step 208B, the method 200 builds a summary vector table T[i+1] for the variables $d_{i+1}$, where i is equal to 1 through m-1. To accomplish this, for each row R in table T[i], iterate over the groups: for j=1, ..., k. The method generates a candidate row that uses the grouping Grouping$_R$ given by row R and maps $d_{i+1}$ to the j-th group as follows:

Grouping$_j$ (n)=Grouping$_R$ (n) if n≦i
j if n=i+1

The footprint for Grouping$_j$ is generated from the footprint for the grouping assignment Grouping$_R$ for row R:

footprint(Grouping$_j$)(n)=footprint(Grouping$_R$)(n) if n≠j
footprint(Grouping$_R$)(n)+size $(d_{i+1})$ if n=j A grouping Grouping$_j$ is deemed to be feasible if its footprint vector can be mapped onto the footprint vector footprint(M) for the memories. As previously discussed, p (footprint(M))=footprint(M). Therefore, Grouping$_j$ is feasible if for n=1, ..., k, p (footprint(Grouping$_j$))(n)<footprint(M) (n)

If the Grouping$_j$ is not feasible, then the method 200 terminates the building of the candidate row, and indicates an unsuccessful outcome.

If the Grouping$_j$ is feasible, then the method 200 uses the summary vector $V_R$ for row R to generate the summary vector V* for the allocation of $d_{i+1}$ to group j. In the example, the summary vector $V_1$, while not shown explicitly, is comprised of the individual vectors for the loops shown in table T[1].

For each k-vector $V_R$ (i), where 1≦i≦p, in the summary vector $V_R$ for row R, the method adds to the j-th element of $V_R$ (i) the access count N (q, i+1) for $d_{i+1}$ in loop q as follows:

For q=1, ..., p,
V*(q,n)=$V_R$ (q,n) if n≠j $V_R$(q,n)+N(q, i+1) if n=j

It is noted that V* is a duplicate if there is already a row S in table T[i+1] with a summary vector V that is equivalent to V*. If V* is not a duplicate, then the method 200 inserts the row for grouping G$_j$ and summary vector V* into table T[i+1].

If table T[i+1] is empty, the variables are not mapped onto the available memories, and the method terminates, unsuccessfully.

Table 2 (below) is of the same form as Table 1 and depicts the summary vector table T[2] for the variable $d_2$, using the assumptions that k=3 and that $Loop_1$ has 1 access to $d_1$ and 1 access to $d_2$, while Loop 2 has 2 accesses to $d_1$ and 2 accesses to $d_2$. As with Table 1, the shaded rows show equivalent allocations that were eliminated.

TABLE 2

| | Table T[2] For variable $d_2$ | |
|---|---|---|
| Groupings <$d_1, d_2$> | Loop 1 1 access to $d_1$ 1 access to $d_2$ | Loop 2 2 accesses to $d_1$ 2 accesses to $d_2$ |
| <1, 1> | <2, 0, 0> | <4, 0, 0> |
| <1, 2> | <1, 1, 0> | <2, 2, 0> |
| <1, 3> | <1, 0, 1> | <2, 0, 2> |
| <2, 1> | <1, 1, 0> | <2, 2, 0> |
| <2, 2> | <0, 2, 0> | <0, 4, 0> |
| <2, 3 | <0, 1, 1> | <0, 2, 2> |

Table 3 (below) is of the same form as Table 1 and depicts the summary vector table T[3] for the variable $d_3$ under the same assumptions as provided for Table 2.

TABLE 3

| | Table T[3] For variable $d_3$ | |
|---|---|---|
| Groupings <$d_1, d_2, d_3$> | Loop 1 1 access to $d_1$ 1 access to $d_2$ 1 access to $d_3$ | Loop 2 2 accesses to $d_1$ 2 accesses to $d_2$ 1 access to $d_3$ |
| <1, 1, 1> | <3, 0, 0> | <5, 0, 0> |
| <1, 1, 2> | <2, 1, 0> | <4, 1, 0> |
| <1, 1, 3> | <2, 0, 1> | <4, 0, 1> |
| <1, 2, 1> | <2, 1, 0> | <3, 2, 0> |
| <1, 2, 2> | <1, 2, 0> | <2, 3, 0> |
| <1, 2, 3> | <1, 1, 1> | <2, 2, 1> |

After generating the various tables (steps 208A, 208B) or otherwise performing the functions of step 208, the method 200 proceeds to step 210. At step 210, the cost of the allocations in a final Table T[m] is determined. In one embodiment of the invention, the method determines the cost as follows:

First, let cost(L, G) be the cost of one repetition of a loop L for a particular grouping G, as defined by:

cost(L, G)=the maximum number of accesses to any one group

Therefore the total cost of grouping G is defined by:

Cost(G)=Σ repetitions(L) * cost(L,G)

L ϵ Loops

At step 212, the costs of the groupings in the set Γ of groupings in the final table T[m] are determined.

Let G be any minimal-cost allocation in Γ. Recall that, as G is feasible, footprint(G) can be mapped onto footprint(M):

for n=1, . . . , k, (p(footprint(G))) (n)≦footprint(M)(n)

At step 214, the variables are allocated to memories according to the lowest determined total cost. In one embodiment of the invention, the mapping a of groups to memories is performed element-wise as follows:

Let $N^+_k$ be the k-vector <1, , . . . , k> of the first k positive integers.

Let $G^*=\sigma$ (footprint(G), $N^+_k$). $G^*$ is the k-vector that gives the integers 1, . . . , k permuted by the permutation applied by p to footprint (G). $G^*$ gives the indices of the groups in an order in which their footprint sizes are non-increasing. So $G^*$ maps groups to memories in a pairing under which each group fits in the corresponding memory.

Recall that G maps variables to groups: G(i) is the index of the group to which variable $d_i$ is allocated.

The allocation mapping α is given by the composition that maps variables to groups and groups to memories:

for n=1, . . . , m, α(n)=G*(G(n)).

Then α maps the indices i=1, . . . , m of the variables in D into the indices j =1, . . . , k of the memories. This determines the required partition.

In one embodiment of the invention, the system 100 of FIG. 1 operates to perform the steps of (a) receiving a list of program loops, a list of variables used in said program loops, and a list of memory resources; (b) for each of a plurality of possible disjoint groups, iteratively performing the steps of: arranging said variables into a plurality of disjoint groups; and determining, for each disjoint group, a cost associated with program loop usage of the variables within the disjoint group; and finally (c) allocating, according to a lowest cost determination, said variables to said available memory.

Figure 4:
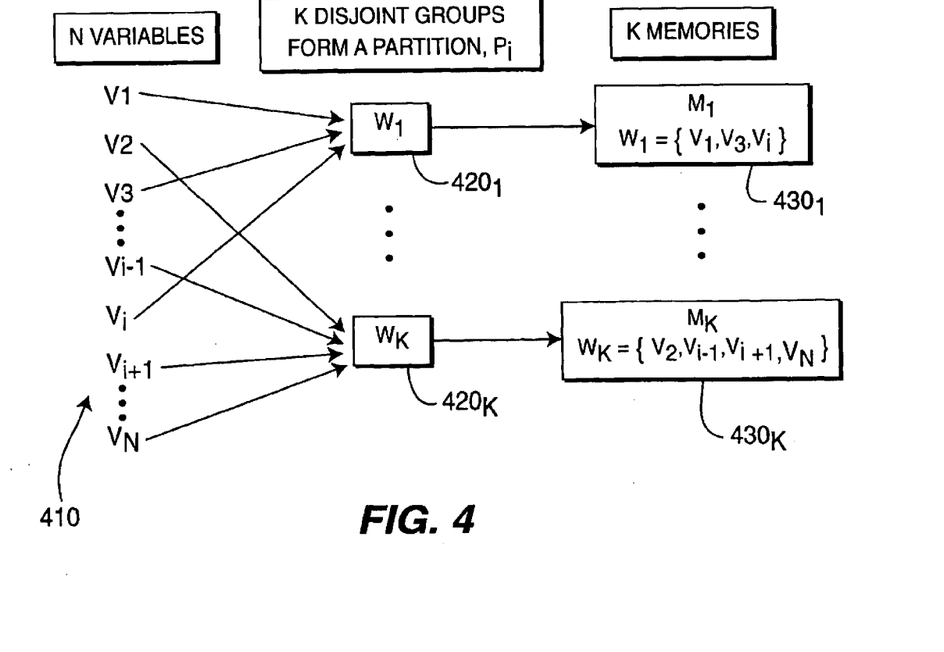
FIG. 4 depicts a high-level representation of a memory-partitioning method according to the present invention.

FIG. 4 depicts a high-level representation of a memory-partitioning method according to the present invention. Specifically, FIG. 4 depicts a plurality (N) of variables 410 denoted as variables $V_1$ through $V_i$ through $V_N$ (collectively variables 410). The variables 410 are divided into a plurality (K) of disjoint groups to form a partition, $P_i$. Referring to FIG. 4, it is noted that the odd numbered variables, namely, $V_1$, $V_3$ up through $V_i$ are combined into a first group 4201 denoted as $W_1$. Similarly, the even variables $V_2$, $V_{I-1}$, $V_{I+1}$ and so on up to $V_N$ are formed into a $K^{th}$ group 420K denoted as WK. Each of the K groups is associated with a respective memory 430. That is, a first group 4201 is associated with a respective memory 4301, a $K^{th}$ group 420K is associated with respective $K^{th}$ memory 430K, and so on. One or more of a group k and/or a partition P may be assigned to respective memory regions, such as contiguous memory regions.

It is noted that in one embodiment of the invention the total number of possible solutions to the memory partitioning "problem" is $2^{n+1}$ ($2^{k-2}-1$), where M variables are uniquely distributed into K memories. The invention operates to find that distribution which is associated with the minimum cost, without exhaustive tabulation, for programs of interest such as loop iterations and the like. It will be recognized by those skilled in the art that the method of the present invention may be applied to other memory allocation environments to achieve relatively low cost (i.e., optimized computational efficiency) solutions.

Figure 3:
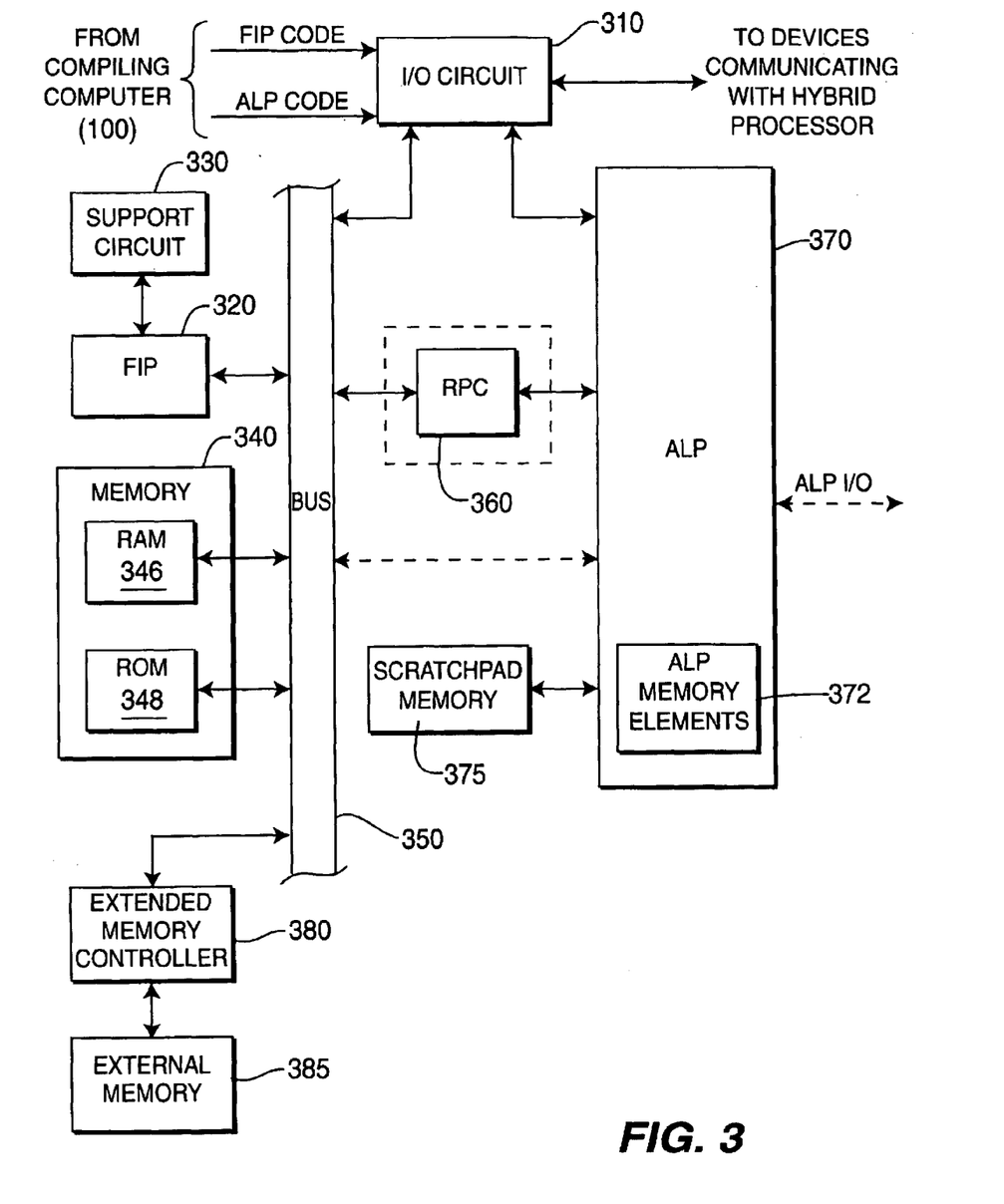
FIG. 3 depicts a functional block diagram of a hybrid processor.

FIG. 3 depicts a functional block diagram of a hybrid processor. Specifically, FIG. 3 depicts a functional block diagram of a hybrid processor 300 comprising an input/output circuit 310, a fixed instruction processor (FIP) 320, support circuitry 330, memory 340 including random access memory (RAM) 346 and read only memory (ROM) 348, an interconnection buss 350, an optional reconfigurable pipeline controller (RPC) 360, and an adaptive logic array (ALP) 370.

The hybrid processor 300 of FIG. 3 receives FIP code and ALP code from the compiling computer 100 of FIG. 1. The FIP code comprises machine readable code that is stored in at least one of the RAM 346 and ROM 348 of memory 340 and is used to provide instructions controlling the operation of the FIP 320. The ALP code comprises code necessary to configure the ALP 370 to operate as a defined logical function or functions.

The RPC 360 performs configuration management and interface functions supporting communication between the FIP 320 and ALP 370. Optionally, the ALP 370 is directly connected to the interface buss 350. The I/O circuit 310, FIP 320 and memory 340 are all connected to the interface buss 350, which supports the transfer of instructions and data and the like therebetween. The support circuits 330 for the FIP 320 include conventional cache, power supplies, clock circuits, data registers, I/O interfaces and the like. The ALP 370 may be connected to the I/O circuit 310. The ALP 370 may also be configured to implement specific input/output functions, as indicated by the ALP I/O signal path depicted in FIG. 3. The I/O circuit 310 is used by the hybrid processor 300 of FIG. 3 to communicate with various devices.

The reconfigurable pipeline controller (RPC) 360 performs configuration management and interface functions for the FIP 320. That is, the RPC attempts to provide a pipelining "solution" to data interface functions within the context of data flow between the FIP 320 and the ALP 370. The pipelining solution allows the FIP 320 to aggregate processor instructions into a set of overlapping processing steps, thereby reducing the time required to perform the processing steps. A method of determining a pipeline schedule is discussed in more detail in the above-referenced CO-SYNTHESIS application.

In one embodiment of the invention, the ALP 370 occupies a portion of the FIP 320 memory space, thereby providing direct access to the ALP 370 by the FIP 320. In this embodiment, variables associated with FIP code may be allocated to memory within the ALP.

A scratch pad memory 375 is associated with the ALP 370 in the case of the ALP 370 requiring such a memory and not otherwise including such a memory. Optionally, an extended memory controller 380 is coupled between the interface bus 350 and an external memory interface (not shown). The extended memory controller 380 coordinates transfers between the hybrid processor 300 of FIG. 3 and external memory devices such as dynamic random access memory (DRAM) and the like. It is noted that the memory 340 may be implemented as an external memory device accessible via the extended memory controller 380.

Referring to FIG. 3, it is noted that several memories are available to store variables. Specifically, memory device 340 includes a RAM 346 and ROM 348. ALP 370 includes ALP memory elements 372, a scratch pad memory 375 is associated with the ALP 370, and an external memory 385 is accessed by either the FIP 320 or ALP 370 via the interface 350 and the extended memory controller 380. The ROM 348 is suitable for holding static variables (i.e., variables that never change after compilation). The RAM 346 is suitable for holding any variable though it is likely that the RAM 346 is best used to hold variables processed by programs executed by the FIP 320. The scratch patch memory 375 and ALP memory elements 372 are capable of holding any variable, though these memory elements are most appropriate to variables utilized by the ALP 370. The external memory 385 may hold any variable, although the external memory 385 is best suited to storing variables that are infrequently accessed, due to the inherent latency of accessing the external memory. That is, the RAM 346 and scratch pad memory 375 may be more rapidly accessed than the external memory 385.

In one embodiment of the invention, the ALP comprises an FPGA processor that has simultaneous access to several dedicated memories. Specifically, the ALP can simultaneously access eight or more small 8-bit scratch pad memories, two 32-bit on-chip SRAMs, and a 32-bit off-chip DRAM. The scratch pad memories are represented by a scratch pad memory 375, the on-chip memory is represented by ALP memory element 372 and the 32-bit off-chip DRAM is represented by external memory 385. Other memory implementations are commonly used in the art. The invention operates to optimize variable assignment based upon the architecture selected and the use of the data within the program executed.

Given that there are multiple available memories, the optimal allocation of variables or data to memory directly depends upon the use of the data. That is, it is desirable to allocate data items that are used simultaneously into different memory modules so that there will be no conflict in the simultaneous access of the data items. Other factors that influence the choice of memory for a specific data include the data type and the overall data item size. The data type comprises the type of data stored within the variable relative to the word size of the memory available. For example, a 16 bit value may be placed within a 16 or 32-bit memory but not (ideally) in an 8-bit memory. The overall data item size means that an array of variables used within a program or program loop must fit within the chosen memory module.

It is assumed that a fixed allocation of data to memory for the duration of program execution is provided. Moreover, an entire array must fit in at least one memory, since it is not desirable to partition a single array among a plurality of memories. It is also assumed that memories can be organized into sets based upon word size, where a variable is allocated in a set if it can be allocated to be any memory within the set. The invention maps a list of variables to a set of memories in which they are allocated.

Since the major regions of activity in a program are loops, the invention concentrates on analyzing accesses to data within loops. In particular, the memory cooperates with a pipeline scheduler or other loop-indicative data such that multiple loop iterations may occur concurrently. Such a pipeline scheduler is disclosed in more detail in the above-referenced CO-SYNTHESIS application. Thus, the present invention may be incorporated within the pipeline scheduling methods of the above-referenced patent application, such that optimization of memory partitions may occur contemporaneously with pipeline scheduling.

It will be appreciated by those skilled in the art that the teachings of the present invention may be adapted to various memory models whether or not they are discussed explicitly herein. Specifically, it is known that, depending upon the memory model selected, read and write operations may overlap or may require serialization, read and write operations may require different amounts of time and other differentiating factors between memory models may be incorporated into the methods of the present invention by those skilled in the art. It is contemplated by the inventors that such modifications to the methods of the present invention, and such application of the methods of the present invention to memory models not explicitly discussed herein are contemplated to be within the scope of the present invention.

In an exemplary compilation method, source code is compiled to produce fixed instruction processor (FIP) instructions and adaptive logic processor (ALP) instructions suitable for use in the hybrid architecture depicted in FIG. 3. That is, the FIP code is stored in the RAM (346) or ROM (348) of the system 300 of FIG. 3. The FIP code is executed by the fixed instruction processor (320) of FIG. 3 to achieve a specific purpose. Similarly, the ALP code is converted, using standard programmable logic tools (e.g., ALP tools 144) ALP code for use in ALP 370 of FIG. 3, illustratively into a field programmable gate array (FPGA) or application specific integrated circuit (ASIC).

The compilation techniques of the above-referenced CO-SYNTHESIS application and the present invention may be combined to provide a dual adaptation method wherein the hardware resources formed on the ALP are adapted to the software to be executed by the FIP, while the software to be executed by the FIP is adapted to constraints imposed by the hardware implementation of the ALP. By iteratively determining optimizations for ALP hardware with respect to FIP software, and FIP software with respect to ALP hardware, the invention provides a computationally efficient implementation of the initially provided source code within the context of a hybrid processor as described in, for example, FIG. 3. Moreover, by incorporating the partitioning determination method of the present invention within the above-described compilation techniques, an optimized solution in terms of computational efficiency may be provided that far exceeds the ability of current optimization techniques generally known to those skilled in the art.

Although various embodiments which incorporate the teachings of the present invention have been shown and described in detail herein, those skilled in the art can readily devise many other varied embodiments that still incorporate these teachings.

What is claimed is:

1. A method for allocating variables to available memory, comprising the steps of:
    analyzing, for each program loop within a program comprising a plurality of loops, the usage of variables by that program loop;
    defining, for each of said program loops, a group that enumerates a placement for said variables;
    defining, for each program loop, an execution schedule for said program loop accommodating said group; and
    assigning said respective variables to cost appropriate storage locations within said memory.

2. The method of claim 1, wherein said step of analyzing comprises the steps of determining the number of times said program loop accesses each variable.

3. The method of claim 1, further comprising the step of:
    dividing said variables into a plurality of disjoint groups to form at least one partition, said at least one partition being assigned to a contiguous portion of memory.

4. A method of allocating program loop variables to available memory structures, comprising the steps of:
    enumerating the access counts for various combinations of variables into a first number of groups by enumerating the possible placement for successive variables, one variable at a time, into said first number of groups;
    determining the cost of each allocation of variables;
    determining the cost of each grouping; and
    allocating variables to said memory structures according to a lowest determined cost.

5. The method of claim 4, wherein said step of enumerating comprises the steps of:
    iteratively building, for each variable, a summary vector table indicative of the access count for each variable by each program loop using that variable.

6. The method of claim 5, wherein the technique of implicit enumeration is used to reduce the exploration space used in building said summary vector tables.

7. The method of claim 5, further comprising the step of:
    arranging said variables as a plurality of disjoint groups, each of said disjoint groups having associated with it a respective memory allocation.

8. A method, comprising the steps of:
    (a) receiving a list of program loops, a list of variables use, in said program loops, and a list of memory resources;
    (b) for each of a plurality of possible disjoint groups, iteratively performing the steps of:
        (b1) arranging said variables into a plurality of disjoint groups; and
        (b2) determining, for each disjoint group, a cost associated with program loop usage of the variables within the disjoint group;
    (c) allocating, according to a lowest cost determination, said variables to available memory in said list of memory resources.

9. A method for allocating memory, comprising the steps of:
    generating an allocation of variables to variable memories for each loop within a program comprising a plurality of loops;
    determining how many times each loop accesses said allocated variables;
    calculating the cost of each allocation; and
    choosing a lowest cost allocation for each of said variables.

10. A method of compiling, comprising the steps of:
    (a) processing received source code to produce an intermediate code wherein said source code comprises fixed instruction processor (FIP) code and adaptive logic processor (ALP) code;
    (b) optimizing said intermediate code for use in a hybrid processor having a fixed instruction processor (FIP) and an adaptive logic processor (ALP);
    (c) optimizing said adaptive logic processor to process at least a non-FIP portion of said optimized intermediate code; and
    (d) repeating steps (b) and (c) to iteratively increase a total optimization level of said FIP-code and said ALP-code.

11. The method of claim 10, wherein step (c) further comprises the step of optimizing said FIP code to allow for increased optimization of said adaptive logic processor code.

12. The method of claim 11, further comprising the steps of:
    (e) analyzing each program loop within said FIP-code to identify loop variables, said loop variables to be allocated to available portions of memory associated with said hybrid processor;
    (f) generating a group that enumerates a placement for said identified loop variables;
    (g) determining, for each of said identified loop variables, a portion of said available memory providing a lowest loop execution cost with respect to said variable; and
    (h) allocating said variables to said identified portion of said available memory.

13. A computer readable medium having computer executable instructions for performing steps comprising:
    analyzing, for each program loop within a program comprising a plurality of loops, the usage of variables by that program loop;
    defining, for each of said program loops, a group that enumerates a placement for said variables;

defining, for each program loop, an execution schedule for said program loop accommodating said group; and assigning said respective variables to cost appropriate storage locations within said memory.

14. The computer readable medium of claim 13, wherein said computer executable instructions for analyzing comprises the steps of determining the number of times said program loop accesses each variable.

15. The computer readable medium of claim 13, having further computer executable instructions for performing the step of:

dividing said variables into a plurality of disjoint groups to form at least one partition, said at least one partition being assigned to a contiguous portion of memory.

* * * * *